United States Patent
Krauer et al.

[15] 3,677,577
[45] July 18, 1972

[54] APPARATUS FOR CHANGING TUBES IN PERISTALTIC PUMPS

[72] Inventors: Werner Krauer; Alfred Martinelli, both of Zurich, Switzerland

[73] Assignee: Polymetron Ltd., Glattbrugg, Switzerland

[22] Filed: Nov. 17, 1969

[21] Appl. No.: 877,296

[30] Foreign Application Priority Data

March 21, 1969 Switzerland ..................4278/69

[52] U.S. Cl. ..................................285/137 R, 137/269
[51] Int. Cl. ..................................................F16l 39/00
[58] Field of Search ..................285/137, 198, 199; 137/608, 137/561, 271, 594, 595, 269

[56] References Cited

UNITED STATES PATENTS

| | | | |
|---|---|---|---|
| 3,548,849 | 12/1970 | Purcell | 137/608 X |
| 3,407,834 | 10/1968 | Brandenberg | 137/271 |
| 1,250,944 | 12/1917 | Beckman | 285/198 |
| 2,876,795 | 3/1959 | Diaz | 285/137 R |
| 3,282,612 | 11/1966 | Younger | 285/137 R |
| 3,469,863 | 9/1969 | Riester et al. | 285/137 R |
| 3,480,036 | 11/1969 | Ehrens et al. | 285/198 X |
| 3,516,691 | 6/1970 | Williams et al. | 285/137 R |

FOREIGN PATENTS OR APPLICATIONS

| | | | |
|---|---|---|---|
| 1,005,793 | 4/1957 | Germany | 285/137 R |
| 61,399 | 4/1968 | Germany | 285/137 R |
| 578,873 | 7/1924 | France | 285/137 R |

OTHER PUBLICATIONS

IBM Technical Disclosure Bulletin, Multiple Pneumatic Coupling, E. F. Helinski, Vol. 11, No. 10, March 1969.

Primary Examiner—Thomas F. Callaghan
Attorney—Craig, Antonelli & Hill

[57] ABSTRACT

An apparatus for changing tubes in peristaltic pumps comprising a coupling member arranged to receive the tubes of the peristaltic pump and a clamping means for pressing the coupling member against a support. The coupling member has a plurality of nipples corresponding to the number of pump tubes and each nipple is surrounded by a sealing ring. The inlet and outlet conduits to the peristaltic pump are inserted in a cover plate which is fixed to the support with a gasket being provided between the plate and the support. The clamping means is in the shape of a stirrup having a tightening screw and a pin on each side of the stirrup for engaging in a notch of the coupling member when the stirrup is moved backwards by means of the tightening screw.

9 Claims, 5 Drawing Figures

APPARATUS FOR CHANGING TUBES IN PERISTALTIC PUMPS

BACKGROUND OF THE INVENTION

The present invention relates to an apparatus for changing tubes in peristaltic pumps, and more particularly, to an apparatus comprising a coupling member adapted to receive the tubes of the peristaltic pump and a clamping means for pressing the coupling member against a support.

In conventional chemical measuring techniques, a sample which is to have its composition monitored often has to be worked up in a certain manner before it is supplied to an analysis instrument. For example, a reagent which undergoes a color reaction with a compound whose concentration has to be determined is added to the sample. The depth of the color produced is determined with a photometer which is equipped with a flowthrough cell. The depth of color is a direct measurement of the concentration which is to be determined.

A further example is that of continuous titration in which the sample stream which is to be continuously monitored has added thereto a certain quantity of a titrating agent. The concentration of the titrating agent is correctly adjusted so that after the sample has been mixed with the titrating agent the chemical system is near the equivalent point and deviations from this state bring about an automatic correction of the concentration by means of a control instrument connected to the titrating instrument.

The foregoing methods and other similar methods of preparing samples share the same characteristic, that is, it is frequently necessary to add more than one solution to the sample. Thus, numerous analyses of the above-mentioned photometric type take place only within a certain pH range. The same is true with respect to continuous Redox titrations. If the sample which is to be monitored does not have the required pH value, it is necessary to add a buffer solution for correcting the pH in addition to the reagents.

For these reasons, an instrument for preparing samples is often required to carry out multiple dosing. Since the samples which have to be monitored are frequently of a severely corrosive nature or may contain substances in suspension, piston pumps with inlet and outlet valves of the kind that are normally used for dosing operations cannot be used due to the choice of material or to the susceptibility of the valves to substances which are likely to be deposited thereon.

However, peristaltic pumps have been found to be extremely satisfactory for the above purpose. These peristaltic pumps have tubes or hoses which are made of rubber, organic high polymers based on chlorinated and fluorinated hydrocarbons or silicone rubber and have excellent corrosion resistance with respect to most aqueous solutions. Peristaltic pumps are also advantageous because they do not utilize valves in their operation. However, peristaltic pumps do suffer from the disadvantage that the tubes or hoses have a limited life because they are subjected to mechanical stresses. Therefore, it is essential that the tubes or hoses in peristaltic pumps be changed at given intervals.

In conventional multiple peristaltic pumps, a disadvantage resides in the fact that after the removal of the old tubes the replacement tubes have to be individually fitted over the nipples of a tube holding device. In addition to this operation requiring both skill and experience, the success thereof also depends upon the static friction between the inner surface of the tube and the surface of the tube nipple. With this operation, the only way the tube can be prevented from becoming detached from the tube nipple when the pump is put into operation is by using only completely dry tubes and tube nipples.

However, it is often quite impossible in using peristaltic pumps to prevent liquid from escaping through the nipple since the nipple is connected to liquid conduits. Another disadvantage of conventional arrangements arises when the peristaltic pump forms part of an automatic analysis apparatus which is used for controlling the concentration in a continuous process, e.g. in chemical process techniques. During the time required for changing the tubes, the automatic analysis apparatus must be rendered inoperative which means that during this time no automatic monitoring of concentration or adjustment of the concentration occurs. This interruption may lead, therefore, to impermissible changes in concentrations in the solution which is to be monitored.

SUMMARY OF THE INVENTION

It is the aim of the present invention to provide an apparatus for changing tubes which obviates the aforementioned disadvantages.

The underlying problems are solved in accordance with the present invention by employing an apparatus for changing tubes in peristaltic pumps which comprises a coupling member arranged to receive the pump tubes and a clamping means for pressing the coupling member against a support.

An advantage of the present invention resides in the fact that the operation of pressing the tubes or hoses onto the nipples of the tube coupling can be accomplished at a remote station from the main apparatus under the most advantageous conditions for keeping the connections clean and dry.

Another advantage of the present invention resides in the fact that the work required for changing the tubes is limited to loosening and retightening the clamping tools between the supports and coupling members.

Another advantage of the present invention is that the conduits leading to and away from the supports can be kept in a fixed position since they do not have to be displaced or removed from the peristaltic pumps when the tubes are being changed.

BRIEF DESCRIPTION OF THE DRAWINGS

These and further features, advantages and objects of the present invention will become more apparent from the following description when taken in connection with the accompanying drawings which show, for purposes of illustration only, an embodiment in accordance with the present invention, and wherein.

DETAILED DESCRIPTION OF THE DRAWINGS

Figure 1:
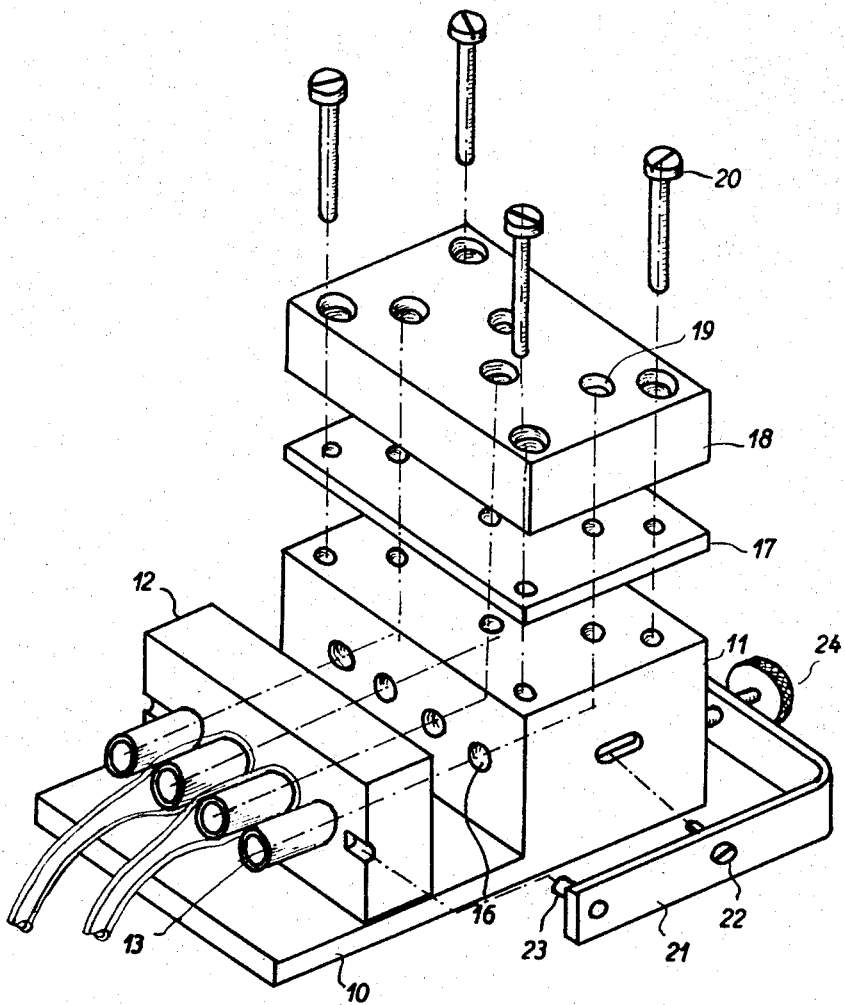
FIG. 1 is an exploded isometric view of a tube coupling in accordance with the present invention.
Figure 2:
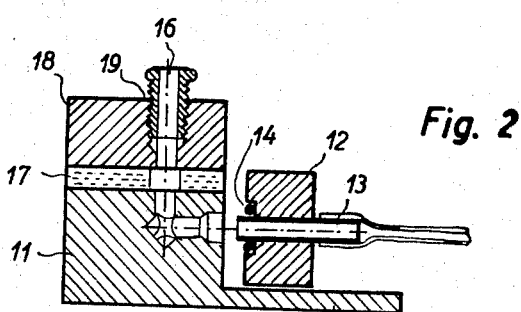
FIG. 2 is a sectional elevation view through the tube coupling of FIG. 1.
Figure 3:
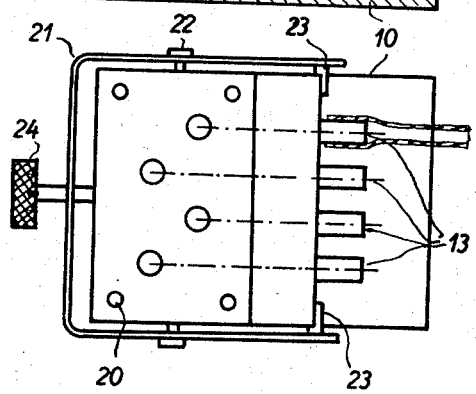
FIG. 3 is a top plan view of the tube coupling shown in FIG. 1.

Referring now to the drawings and in particular to FIG. 1, an apparatus for changing tubes of peristaltic pumps is illustrated. The apparatus comprises a support 11 which is mounted on a base plate 10 and has inlet apertures 16 on one end face. These apertures 16 lead into bores which cooperate with bores on the upper surface of the support so as to form passages. A gasket 17 is arranged on the upper surface of the support and a cover plate 18 is arranged on the gasket 17 and is attached to the support 11 by conventional connecting means such as threaded screw members 20. Both the gasket 17 and the cover plate 18 have apertures which coincide with the passages in the support 11. The apertures in the cover plate 18 have screw threads 19 into which packing glands provided with inflow or outflow pipe conduits may be inserted as seen in FIG. 2.

A coupling member 12 is designed so as to be pressed against the end face of the support 11 by means of a clamping stirrup 21. This coupling member 12 contains a number of nipples 13 which correspond to the number of inlet apertures. On the side facing the support 11, these nipples 13 project slightly beyond the surface of the coupling member 12 and penetrate the inlet apertures 16 when the coupling member 12 is placed against the support 11. On the side of the coupling member which is to press against the face of the support 11, each nipple 13 is surrounded by a sealing ring 14 which is partly sunk into a recess in the coupling member 12. The extent to which the sealing rings 14 are sunk into the surface is such that the rings project beyond the plane of the coupling member so that when the coupling member is pressed against the support 11 each ring 14 forms a seal for its corresponding nipple 13.

The coupling member 12 is pressed against the support 11 by means of the clamping stirrup 21. The clamping stirrup has two bolts 22 which serve to hold the stirrup in a longitudinally displaceable manner in the support 11. A pin 23 on each side of the stirrup 21 fits into a notch of the coupling member 12 as soon as the clamping stirrup is moved backwards by a tightening screw 24. By means of this tightening screw, the coupling member 14 is pressed against the support 11 which establishes, in connection with the sealing rings 14, a separate connection for each nipple 13 to its corresponding passage. On the other hand, the parts can be separated simply by loosening the tightening screw 24, whereupon the coupling member 12 can be released from the support 11 and thereafter removed.

The foregoing description illustrates that the apparatus in accordance with the present invention enables each of a set of tubes to be connected to a coupling member at each end and all the requirements for keeping the nipples and tubes clean and dry can now be observed. As soon as a change of tubes is necessary, the used set of tubes can be removed within an extremely short time and the prepared replacement set can be inserted. The interruption in the operation of the peristaltic pumps can therefore be reduced to only one or two minutes whereas with the conventional methods at least fifteen minutes were required. It is also a special advantage of the present invention that the pipe conduits leading to the packing glands 19 need not be removed and remounted when the tubes are replaced.

Figure 4:
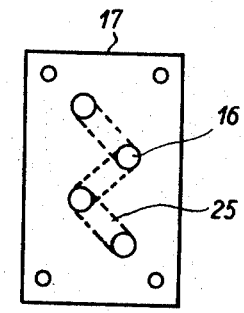
FIG. 4 illustrates a constructional detail of the tube coupling in accordance with the present invention.
Figure 4A:
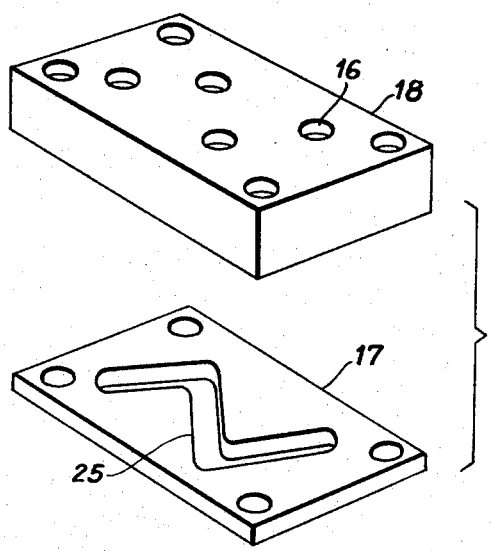
FIG. 4A is an exploded enlarged isometric view of the detail shown in FIG. 4.

Further, the design of the support with the gasket 17 and the covering plate 18 mounted thereon enables the four separate pump lines to be combined in a simple manner either at the inlet end or at the outlet end. For this purpose, channels 25 connecting the apertures as required are cut into the gasket as shown in FIG. 4. This combination can be altered simply by inserting a different gasket.

While we have shown and described only one embodiment in accordance with the present invention, it is understood that the same is not limited thereto but is susceptible of numerous changes and modifications as known to a person skilled in the art, and we, therefore, do not wish to be limited to the details shown and described herein but intend to cover all such changes and modifications as encompassed by the scope of the invention.

We claim:

1. A tube changing apparatus for use in a peristaltic pump or the like of the type having at least one tube; said apparatus comprising; support means with passages therethrough, a cover plate attached to said support means, said cover plate having conduit means disposed therein for conducting fluids therethrough, gasket means provided between said cover plate and said support means and having aperture means for conducting fluids therethrough coupling means with at least one first nipple means for receiving the at least one tube, said nipple means being in fluid communication with said passages, and detachable clamping means for pressing said coupling means against said support means, characterized in that said clamping means includes a U-shaped stirrup member having a base section and two arm members extending substantially perpendicularly from the ends of said base section, at least one of said arm members having pin means extending therefrom, said base section having screw means extending therethrough in a direction parallel to the arm members, said coupling means having at least one notch therein for engagement with said pin means, wherein said stirrup member is positionable about the support means and the coupling means to clamp them together by the engagement of the screw means with the support means and the engagement of the pin means with the at least one notch whereby fluid communication is established through the cover plate, the gasket means, the support means and the coupling means.

2. A tube changing apparatus according to claim 1, characterized in that the passages correspond in number to the first nipple means and are disposed to communicate at one end thereof with respective first nipple means when the coupling means is clamped to the support means, the other end of the passages being disposed to communicate with said gasket aperture means.

3. A tube changing apparatus according to claim 1, characterized in that said gasket aperture means contains channels communicating with more than one passage at one side thereof, said channels communicating with said conduit means on the other side of the gasket.

4. A tube changing apparatus according to claim 2, characterized in that said coupling means includes second nipple means corresponding in number to the first nipple means and disposed at the opposite side of the coupling means from the first nipple means, and said support means contains recesses at the ends of the passages for receipt of said second nipple means.

5. A tube changing apparatus according to claim 4, characterized in that said coupling means includes annular recesses disposed about each of said second nipple means and sealing means disposed within each of these annular recesses.

6. A tube changing apparatus according to claim 1, characterized in that each arm member is provided with a pin means for engagement each with one of two notches in the coupling means, said two notches being disposed at opposite edges of the coupling means.

7. A tube changing apparatus according to claim 6, characterized in that each of the arm members is provided with a guide bolt for engagement with respective guide slots at two opposite sides of the support means.

8. A tube changing apparatus according to claim 1, characterized in that the passages are L-shaped with the horizontal portion of the L positioned to be in communication with the coupling means and the vertical portion of the L positioned to be in communication with the gasket means.

9. A tube changing apparatus according to claim 8, characterized in that each arm member is provided with a pin means for engagement each with one of two notches in the coupling means, said two notches being disposed at opposite sides of the coupling means, and each of the arm members being provided with a guide bolt for engagement with respective guide slots at two opposite sides of the support means.

* * * * *